United States Patent
Lai et al.

(10) Patent No.: US 12,034,376 B2
(45) Date of Patent: Jul. 9, 2024

(54) HYBRID MODULATION CONTROLLED DC-TO-AC CONVERTERS

(71) Applicant: VIRGINIA TECH INTELLECTUAL PROPERTIES, INC., Blacksburg, VA (US)

(72) Inventors: Jih-Sheng Lai, Blacksburg, VA (US); Chih-Shen Yeh, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 226 days.

(21) Appl. No.: 17/765,611

(22) PCT Filed: Sep. 30, 2020

(86) PCT No.: PCT/US2020/053424
§ 371 (c)(1),
(2) Date: Mar. 31, 2022

(87) PCT Pub. No.: WO2021/071708
PCT Pub. Date: Apr. 15, 2021

(65) Prior Publication Data
US 2022/0385193 A1    Dec. 1, 2022

Related U.S. Application Data

(60) Provisional application No. 62/913,797, filed on Oct. 11, 2019.

(51) Int. Cl.
*H02M 3/335* (2006.01)
*H02M 1/00* (2006.01)
(Continued)

(52) U.S. Cl.
CPC ..... *H02M 3/33573* (2021.05); *H02M 1/0058* (2021.05); *H02M 1/08* (2013.01);
(Continued)

(58) Field of Classification Search
CPC .. H02M 3/33573; H02M 1/0058; H02M 1/08; H02M 3/01
See application file for complete search history.

(56) References Cited

U.S. PATENT DOCUMENTS 10,097,092 B1 * 10/2018 Ho ............... H02M 3/1584
11,005,370 B2 * 5/2021 Tt ............... H02M 3/1584
(Continued)

OTHER PUBLICATIONS

International Search Report mailed Jan. 4, 2021.
(Continued)

*Primary Examiner* — Jue Zhang
*Assistant Examiner* — Afework S Demisse
(74) *Attorney, Agent, or Firm* — Thomas Horstemeyer, LLP (57) ABSTRACT

Aspects of hybrid modulation control for DC-to-AC converters are described. In one embodiment, a hybrid modulation pattern is generated. The hybrid modulation pattern separates switch gating control into multiple control regions for a half cycle of the waveform. A first control region modulates according to a first modulation technique and a second control region modulates according to a second modulation technique. The switches of a resonant converter are controlled according to the hybrid modulation pattern to generate the waveform.

20 Claims, 6 Drawing Sheets

(51) Int. Cl.
*H02M 1/08* (2006.01)
*H02M 3/00* (2006.01)
*H02M 7/5387* (2007.01)

(52) U.S. Cl.
CPC ......... *H02M 3/01* (2021.05); *H02M 3/33576* (2013.01); *H02M 7/5387* (2013.01)

(56) References Cited

U.S. PATENT DOCUMENTS

2013/0010503 A1   1/2013  Choi
2018/0062537 A1   3/2018  Wang et al.
2018/0145594 A1*  5/2018  Akre .................. H02M 3/1584

OTHER PUBLICATIONS

Anand et al., "An Uni-directional Single-Phase soft-switches Resonant High Frequency Link Inverter", IEEE International Conference on Power Electronics, Drives and Energy Systems, Dec. 18, 2018, pp. 1-6.
Yeh et al., "A Hybrid Modulation Method for Single Stage Soft-Switching Inverter Based on Series Resonant Converter", IEEE Transactions on Power Electronics 35.6, Oct. 17, 2019, pp. 5785-5796.

* cited by examiner

HYBRID MODULATION CONTROLLED DC-TO-AC CONVERTERS

CROSS-REFERENCE TO RELATED APPLICATION

This application claims priority to and benefit of all of the following related applications, as the 35 U.S.C. § 371 national stage application of PCT Application No. PCT/US2020/053424, filed on Sep. 30, 2020, and entitled "HYBRID MODULATION CONTROLLED DC-TO-AC CONVERTERS," which claims priority to, and the benefit of, U.S. Provisional Application No. 62/913,797, filed on Oct. 11, 2019, and entitled "AC Waveform Production Method with Hybrid Pulse Amplitude Modulated Converter," the entire contents of all of the related applications is hereby incorporated herein by reference.

STATEMENT REGARDING FEDERALLY SPONSORED RESEARCH OR DEVELOPMENT

This invention was made with Government support under Grant No. DE-AR0000904, awarded by the Department of Energy. The Government has certain rights in the invention.

BACKGROUND

Direct current (DC) to alternating current (AC) converters can involve DC link inverters and pseudo dc-link inverters. The inverters can be isolated by high frequency transformers, which also provide the freedom of step-up/down through winding turns ratio. A pseudo dc-link inverter is based upon a pulse width modulation (PWM) converter like a flyback converter, but the accompanying switching losses can degrade efficiency and overall system performance. Resonant converters (e.g., series resonant converter) that attempt soft-switching characteristics can have problems with high resonant current and limited soft-switching range. As a result, there is a need for a more efficient implementation and control methodology DC-to-AC converters.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

SUMMARY

The present disclosure relates to hybrid modulation for direct current (DC) to alternating current (AC) converters. To overcome inefficiencies of existing technologies, a hybrid modulation method can be utilized.

Some aspects of the present disclosure include a computer-implemented method for generating a waveform. The method can include determining a hybrid modulation pattern that separates switch gating control into multiple control regions for a half cycle of the waveform. A first control region controls the switches according to a first modulation technique and a second control region controls the switches according to a second modulation technique. The method can also include controlling switches of an inverter or modulator of a resonant converter according to the hybrid modulation pattern to generate the waveform.

Additional aspects include a system for waveform generation. The system can include a modulating circuit and a rectifying circuit that generates a waveform based on the hybrid modulation pattern. The modulating circuit can include switches controlled according to a hybrid modulation pattern that separates switch gating control into multiple control regions for a half cycle of the waveform. A first control region controls the switches according to a first modulation technique and a second control region controls the switches according to a second modulation technique. The rectifying circuit is communicatively coupled to the modulating circuit.

Further aspects of the disclosure include instructions stored in computer-readable media. A hybrid modulation pattern is generated. The hybrid modulation pattern separates switch gating control into multiple control regions for a half cycle of the waveform. A first control region modulates according to a first modulation technique and a second control region modulates according to a second modulation technique. Switches of an inverter or modulation component of a DC-to-AC converter are controlled according to the hybrid modulation pattern to generate the waveform.

DETAILED DESCRIPTION

The present disclosure relates to hybrid modulation for direct current (DC) to alternating current (AC) converters. Some techniques such as flyback converters and pulse width modulation converters can be accompanied by switching losses that degrade efficiency and overall system performance. However, this disclosure describes operational principles of hybrid modulation that can avert performance losses of the existing techniques. Various implementations of the present disclosure can include a first control region which controls the plurality of switches according to a first modulation technique and a second control region which controls the plurality of switches according to a second modulation technique. For example, in a high-output region, the inverter can operate with variable-frequency modulation, which leads to zero-voltage-switching and relatively low resonant current. In a low-output region, the inverter operates with a short pulse density modulation so that switching losses are greatly curtailed without excessive resonant current. This mechanism can avert performance losses of previous techniques.

Aspects of the present disclosure can include an inverter or other modulation components capable of converting a DC input into a modulating signal. Line-frequency inverters can provide electrical energy to utility grids and motors. Their input can be photovoltaic (PV) panels, fuel cells, lithium-ion batteries and other dc sources. Some systems can use galvanic isolation for an inverter. The use of an isolation transformer can enable high step-up/down applications that have flexibility in choosing winding turns ratio that can be problematic with non-isolated inverter topologies.

High-frequency transformers can reduce weight and size compared with line-frequency transformers. In order to adopt a high-frequency transformer, an isolated DC-DC converter can be cascaded with an inverter. This configuration is capable of diverting input double line-frequency ripple to the DC-link and therefore can be used for photovoltaic (PV) applications. However, both circuit complexity and power loss can be increased because of the extra front stage.

Pseudo DC-link inverters can be referred to single-stage inverters because the unfolding component can be nearly lossless with the aid of low on-resistance devices. This can increase system efficiency. In a pseudo DC-link inverter, the modulation can be performed by an isolated DC-DC stage that generates a rectified sinusoidal wave. Capacitance on the pseudo dc-link can be limited to prevent waveform distortion and the decoupling capacitor can be located at the input. The isolated DC-DC stage can include a pulse-width-modulated (PWM) converter. However, in conventional systems the device hard-switching and voltage spike can restrain the system's efficiency and reliability.

A series resonant converter (SRC) can have relatively high efficiency, simple structure and wide soft-switching range, and can also be used for an isolated DC-DC stage. The circuit topology of SRC-PDI can operate without requiring auxiliary switches. While a SRC-PDI circuit can use a single control method, the present disclosure enables hybrid modulation using multiple control paradigms. The hybrid modulation can include multiple control methods including phase-shift modulation (PSM), variable-frequency modulation (VFM) and pulse density modulation (PDM) or short PDM (SPDM).

Figure 1:
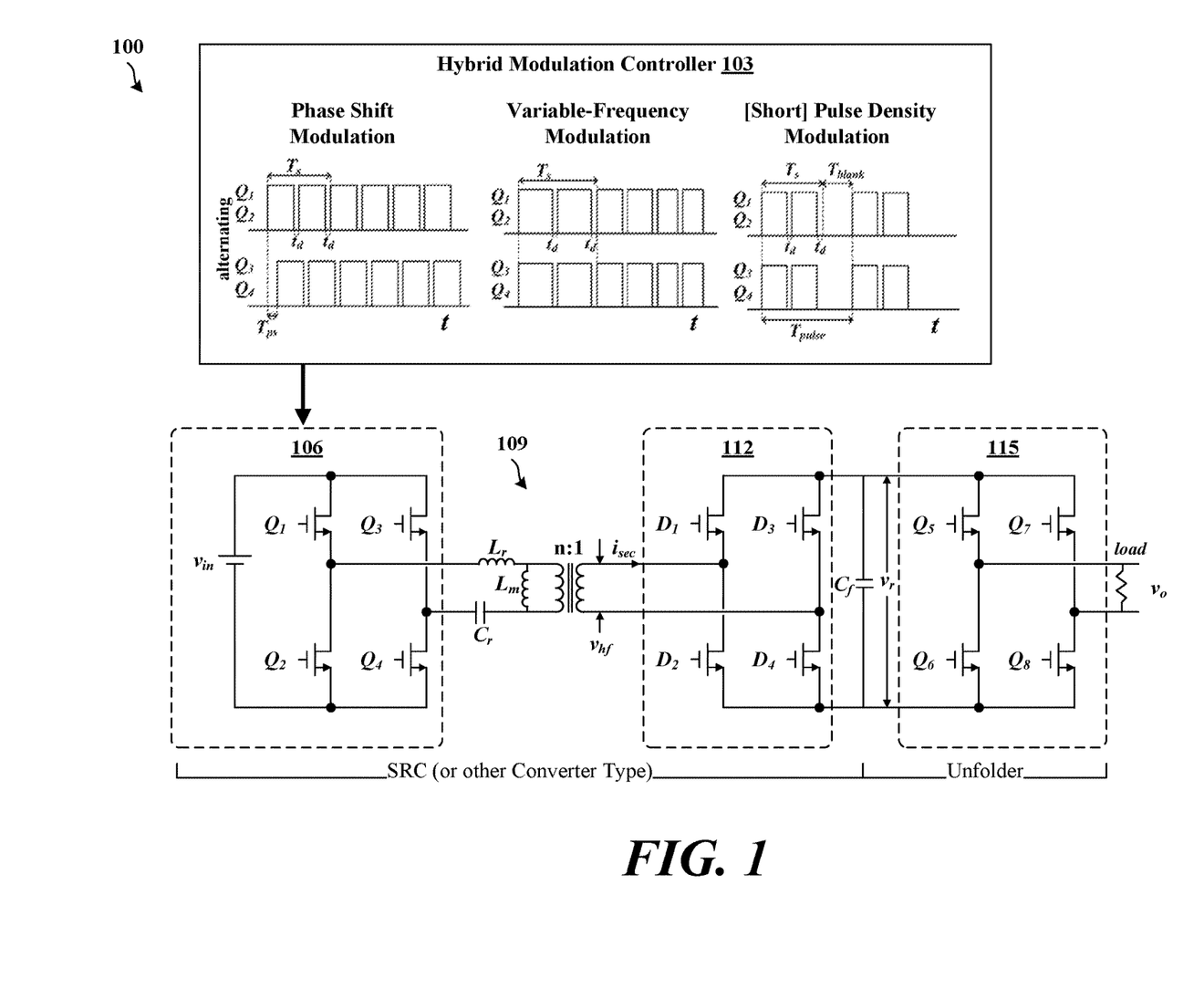
FIG. 1 illustrates an example of a hybrid modulation controlled DC-to-AC converter, according to embodiments of the present disclosure.

Moving to the figures, FIG. 1 shows a hybrid modulation controlled DC-to-AC converter or hybrid modulation converter 100. The hybrid modulation converter 100 can include a hybrid modulation controller 103, an inverter or modulation component 106, a transformer component 109, a rectifying component 112, and an unfolding component 115.

The hybrid modulation controller 103 can utilize multiple different control methods including PSM, VFM, PDM, SPDM, and others. These control methods can be integrated into a hybrid modulation method as described. These methods can be described as follows.

1) PSM: This phase-shift control method can inject a delay or phase shift time ($T_{ps}$) between two primary-side legs while keeping constant switching frequency. During the delay time, two upper/lower switches turn on and the power flow towards the load is blocked. $T_s$ can be the duration of two consecutive pulses including dead time $t_d$. Therefore, the power delivery can be done within the rest of the time where a diagonal pair of switches turns on. In each cycle, such condensed power delivery can cause higher resonant current peak and eventual higher conduction loss compared to non-phase-shift control. Aside from the high resonant current, another issue lies in the zero-voltage-switching (ZVS) range. The SRC can lose the ZVS feature under light load and low output voltage conditions. Nevertheless, PSM can be used effectively to regulate output voltage all the way down to zero.

2) VFM: This variable-frequency control method regulates output voltage by changing the switching frequency. Unlike phase-shift control, variable-frequency control does not have idle state in power delivery, so the resonant current peak is relatively low. However, generating output voltage that approaches zero using VFM would use unrealistic zero or infinite switching frequency. Wide switching frequency range is unavoidable for setting up a rectified sinusoidal wave especially under light load. The practical limitations and the lack of full-range ZVS feature make VFM alone an unattractive option. Also, the drawback under light load heavily restricts its applicability. However, to avoid this, the present hybrid modulation controller 103 uses a hybrid control method that replaces VFM with other modulation methods such as PDM or SPDM for problematic areas of a waveform including low or zero output voltage areas.

3) PDM/SPDM: Pulse density control methods can be used a length of blank time $T_{blank}$ where all switches turn off to adjust output power and long blank time results in low output power. It is also known as pulse frequency ($T_{pulse}-1$) control while the term "pulse density" is chosen to be better distinguished from the switching frequency. Pulse density control can be used in burst mode for improving SRC light-load efficiency. The frequency of each gate signal can be chosen close to the resonant frequency where SRC has maximum efficiency. When the number of consecutive pulses before the blank time is high, output voltage can have a large low-frequency ripple. Since the pseudo DC-link capacitance in a SRC-PDI can be small, such ripple becomes tremendous and unacceptable. The present hybrid modulation controller 103 uses a hybrid control method that can utilize PDM (or SPDM) while minimizing drawbacks by switching between control methods as described further below.

TABLE 1

Comparison of Constituent Modulation Methods

| | PSM | VFM | PDM |
|---|---|---|---|
| Modulation range | Full | Unable to modulate in low output region | Full |
| Switching loss reduction | ZVS except for low-output/light-load region | ZVS except for low-output/light-load region | Equivalently low frequency in terms of switching losses |
| Resonant current | High | Medium | Very high |

The features of PSM, VFM and PDM are summarized in Table I. Hybrid modulation controller 103 can use 2, 3, or more of these modulation techniques to maximize their benefits while minimizing their drawbacks. For example, VFM and PDM individually have deficiencies that make them generally difficult to utilize. However, a hybrid modulation method that modifies and combines these techniques can provide a practical option for SRC-PDI. When output is in high absolute-voltage region (i.e., high-output region), the hybrid modulation controller 103 can control the modulation component 106 using VFM, for example, in order to have relatively low resonant current. The VFM can have switching frequency beyond resonant frequency. In low-line region, the hybrid modulation controller 103 can control the modulation component 106 in a modified short pulse density modulation or SPDM. On top of smooth transition toward VFM region, SPDM can include the switching loss reduction from PDM while maintaining a comparatively lower resonant current peak. The SPDM control can be considered a PDM control type.

The modulation component 106 can include switches $Q_1$, $Q_2$, $Q_3$, and $Q_4$ arranged in a full bridge, half bridge, or other circuit arrangement. The modulation component 106 can take DC voltage v as an input, and modulate this DC voltage into an AC voltage or other modulated voltage, and provide the modulated voltage to a transformer circuit or transformer component 109. The hybrid modulation controller 103 can control the switches $Q_1$, $Q_2$, $Q_3$, and $Q_4$ to generate the modulated voltage based on the DC voltage.

A number of passive or active circuit components can also be utilized in conjunction with transformer component 109 based on the converter type. For example, $L_r$, $L_m$, and $C_r$ can be discrete components or constituent representations associated with the transformer component 109. The transformer component 109 can also transform a magnitude of the modulated voltage based on the ratio of turns n:1 of the transformer component 109.

The rectifying component 112 can include switches or diodes $D_1$, $D_2$, $D_3$, and $D_4$ arranged in a full bridge, half bridge, or other circuit arrangement. The rectifying component 112 can rectify the modulated voltage into a rectified modulated voltage yr. In some cases, the capacitor or capacitance $C_f$ can be included to smooth this voltage, and in other examples $C_f$ can be omitted. Where $D_1$, $D_2$, $D_3$, and $D_4$ are switching diodes or switches, the hybrid modulation controller 103 or a separate control device can provide control signals.

The unfolding component 115 can include switches $Q_5$, $Q_6$, $Q_7$, and $Q_8$ arranged in a full bridge, half bridge, or other circuit arrangement. The unfolding component 115 can take the rectified modulated voltage $v_r$ as an input and unfold it to generate an unfolded AC output voltage $v_o$. While the load is represented as a resistive load, the load can also include reactive components and effects.

Except for the ZVS mechanism near peak output, magnetizing inductance $L_m$ can be neglected in some simplified analyses. The switching frequency can be maintained higher than series resonant frequency, causing a LLC converter to behave like a SRC. In addition, mathematical expressions can be very complex while changing the resulting calculations in a minimal manner. As a result, in some cases the calculations discussed herein can include simplified expressions, while more accurately modeled expressions can also be utilized in other examples. While other examples can be used, one example can be based on a 400V-230$V_{ac}$ SRC-PDI arrangement. This can achieve output power of 2 kW and peak efficiency of 98.0%. This shows that the hybrid modulation control techniques implemented using the hybrid modulation controller 103 can be greater than conventional controlled SRC-PDI devices.

Figure 2:
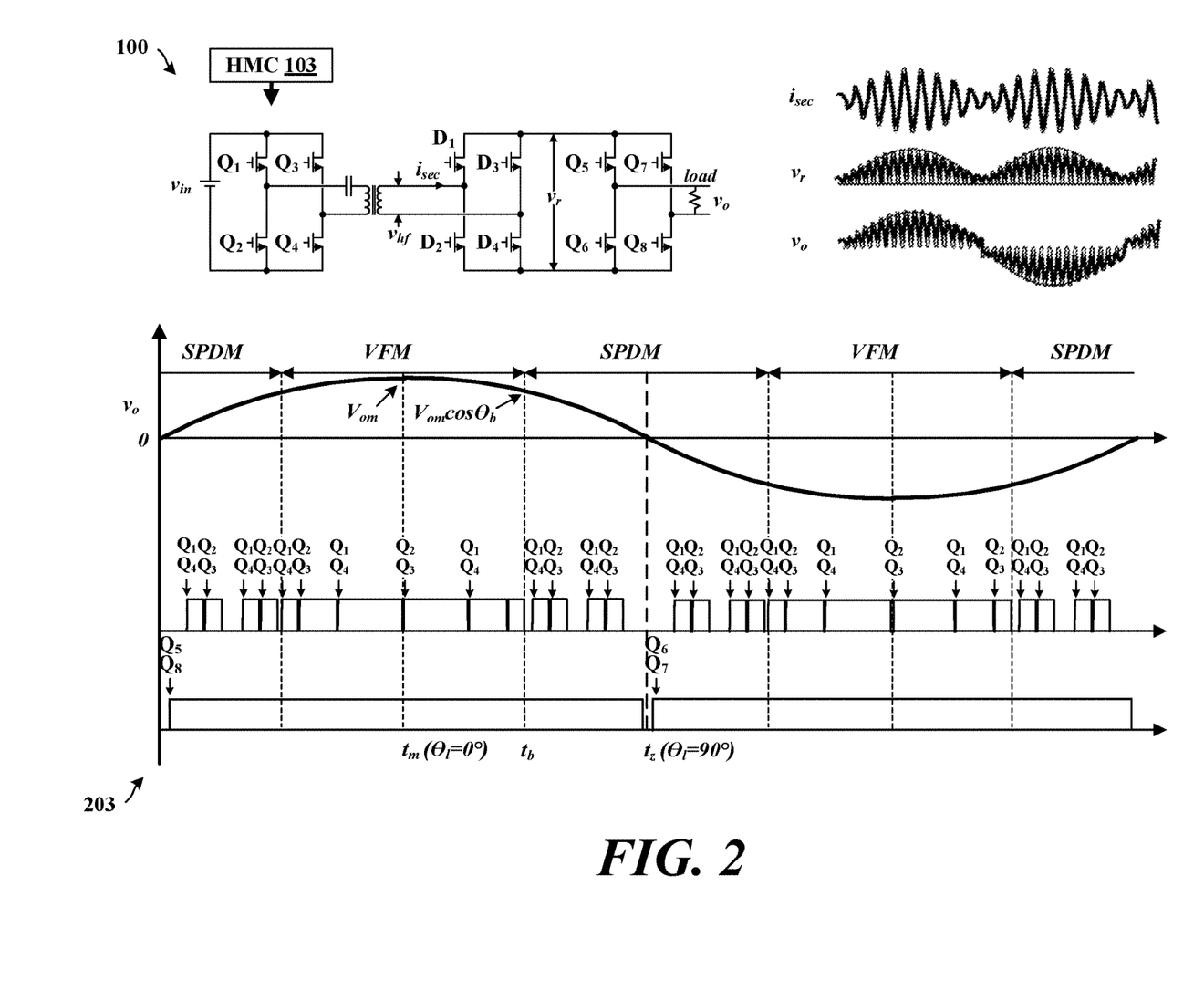
FIG. 2 illustrates an example of the operation of the hybrid modulation controlled DC-to-AC converter of FIG. 1, according to embodiments of the present disclosure.

FIG. 2 shows an example of the operation of the hybrid modulation controlled DC-to-AC converter 100. Example waveforms are provided for $v_{hf}$, $v_r$, and $v_o$. The waveforms for $V_{hf}$, $V_r$, and $v_o$ are illustrative, and can differ in waveform or wave shape based on resonant circuit arrangement. The figure also shows a graph 203 that includes switching control signals for modulator or inverter switches $Q_1$, $Q_2$, $Q_3$, and $Q_4$ as well as unfolder switches $Q_5$, $Q_6$, $Q_7$, and $Q_8$.

The device gate signals of the hybrid modulation technique implemented by the hybrid modulation controller 103 are plotted. $Q_1$-$Q_4$ can include high-frequency switches and $Q_5$-$Q_8$ can include line-frequency switches. A diagonal pair of switches (e.g., $Q_1$ and $Q_4$) can conduct simultaneously, while a pair of switches on a same leg (e.g., $Q_1$ and $Q_2$) can be complementary with shoot-through-preventing deadtime. When the output voltage reaches a maximum $V_{om}$ at $t_m$, line angle $\theta_l$ can be defined to be 0° and the switching frequency can be minimal.

Once the output voltage reaches a mode change boundary angle $\theta_b$ at mode change boundary time $t_b$, the switching frequency stops rising and pulse density begins to decrease. In other words, in some examples, the mode change boundary angle $\theta_b$ can be selected to be a point where the switching frequency is maximized. The definition of switching frequency $f_s$ and pulse density $\rho_p$ can be listed in equations (1) and (2).

$$f_s = 1/T_s \qquad (1)$$

$$\rho_p = T_s T_{pulse} \qquad (2)$$

$T_s$ can be the duration of two consecutive pulses, including dead-time, and $T_{pulse}$ can be the time from the end of a blank time to the next end. At the termination of a positive half cycle of the waveform, the unfolding component 115 switches at the zero-crossing-point $t_z$ where $\theta_l$ is 90°. In the positive/negative half cycle, the circuit operation can be symmetrical to the output peak/valley. High-frequency gate signals can be identical in both half cycles.

Figure 3:
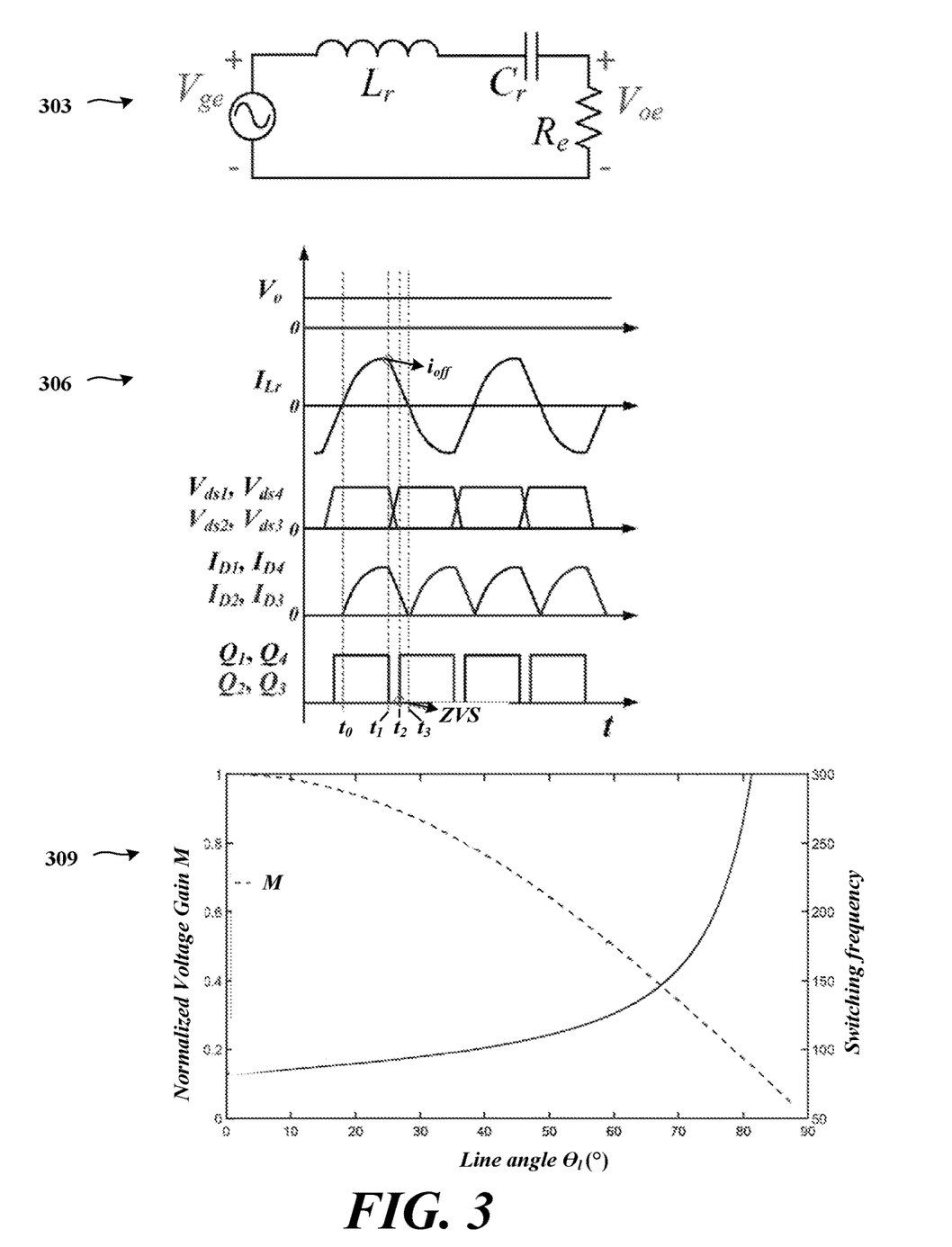
FIG. 3 illustrates an example of an equivalent circuit model and a graph of waveforms for an example variable frequency modulation region of the hybrid modulation controlled DC-to-AC converter of FIG. 1, according to embodiments of the present disclosure.

FIG. 3 shows an equivalent circuit model 303, a graph 306 of waveforms for an example VFM region of the hybrid modulation controlled DC-to-AC converter 100. FIG. 3 also shows a graph 309 of switching frequency over line angle for a particular quality factor. The equivalent circuit model 303 includes an equivalent input voltage $V_{ie}$, an inductance $L_r$ in series with a capacitance $C_r$ and an equivalent resistance $R_e$. An equivalent output voltage $V_{oe}$ can be across the equivalent resistance $R_e$.

Details of VFM operation of the hybrid modulation controlled DC-to-AC converter 100 can be depicted on graph 306, where output voltage can vary minimally or can be substantially constant under a small time scale. Power delivery can include no idle state as current can be delivered constantly to the load by the rectifier diodes. In order to obtain ZVS, f can exceed series resonant frequency $f_r$, which can be defined in equation (3).

$$f_r = \frac{1}{2\pi\sqrt{L_r C_r}} \qquad (3)$$

Thus, $Q_1$ and $Q_4$ can turn off at $t_1$ with current $i_{off}$. With the assistance of $i_{off}$, the parasitic output capacitor of $Q_1$ and $Q_4$ can be fully discharged before $t_2$ so ZVS turn-on can be achieved. However, when output voltage and output current are low, the instantaneous power is also low, and the resonant current can drop. In this circumstance, $i_{off}$ can be insufficient for complete discharge regardless of the timing of turn-off. As a result, the hybrid modulation controller can switch to SPDM, PDM, or another appropriate modulation method at a mode change boundary angle $\theta_b$, that prevents the VFM region from being overextended into a low-output region that can deprive the ZVS characteristic.

If $f_s$ decreases toward $f_r$, $t_1$ can shift right and $i_{off}$ can reduce. Moreover, when $f_s$ matches $f_r$, $i_{off}$ can substantially reach zero. This can happen at output peak where $f_s$ is selected to be close to $f_r$ in order to optimize efficiency. The issue of low $i_{off}$ can be handled by $L_m$, which can provide a minimum value of $i_{off}$ described in equation (4) and it is most effective at output peak ($\theta_l=0°$). Although the effect of $L_m$ fades away with $\theta_l$ increasing, the original $i_{off}$ should be sufficient due to high $f_s$. The ZVS in VFM is the only part that $L_m$ is involved and as formerly stated, the rest of the analysis assumes $L_m$ is large enough to be neglected.

$$i_{off\_min} = I_{Lm\_pk} = \frac{n|V_o|}{4 f_s L_m} \quad (4)$$

Under VFM operation the voltage gain of the SRC can be derived by using a harmonic approximation method using the equivalent circuit model 303, where equivalent load resistance $R_e$ can be defined by equation (5).

$$R_e = \frac{8}{\pi^2} n^2 R_o \quad (5)$$

The normalized voltage gain (M) equation can be derived in equation (6) and then modified to switching frequency equation in equation (7). The definition of effective quality factor $Q_e$ can be shown in equation (8).

$$M(f_s) = \frac{V_{oe}}{V_{ge}} = \left| \frac{R_e}{R_e + \frac{1}{j2\pi f_s C_r} + j2\pi f_s L_r} \right| \quad (6)$$

$$f_s = f_r \sqrt{1 + \frac{1-M^2}{2M^2 Q_e^2} + \frac{1}{2}\sqrt{\frac{4(1-M^2)}{M^2 Q_e^2} + \frac{(1-M^2)^2}{M^4 Q_e^4}}} \quad (7)$$

$$Q_e = \frac{Z_o}{R_e} = \sqrt{\frac{L_r}{C_r}} \frac{1}{R_e} \quad (8)$$

These equations can be utilized to identify a mode change boundary angle $\theta_b$. For example, the mode change boundary angle $\theta_b$ can correspond to the line angle $\theta_l$ indicated in graph 309 for a particular switching frequency, which can correspond to a maximum switching frequency of a switching device, and/or a selected maximum frequency being utilized by the hybrid modulation converter 100.

Figure 4:
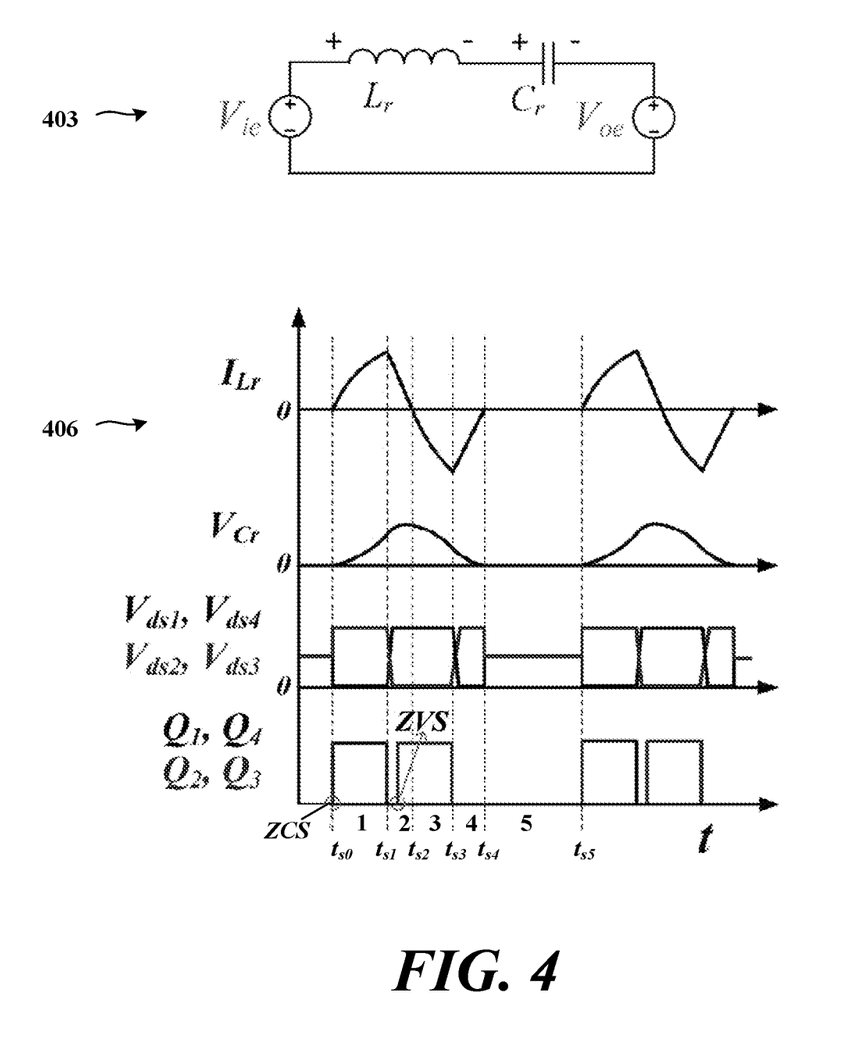
FIG. 4 illustrates an example of an equivalent circuit model and a graph of waveforms for an example short pulse density modulation region of the hybrid modulation controlled DC-to-AC converter of FIG. 1, according to embodiments of the present disclosure.

M can be a sinusoidal function of $\theta_l$ as plotted in graph 309, because it is naturally proportional to the output voltage. Since equation (7) has expressed $f_s$ in terms of M, the changes of $f_s$ over $\theta_l$ can be solved and plotted in graph 309 as well. While the result is based on a particular $Q_e$, $f_s$ over $\theta_l$ can also vary based on circuit conditions as can be understood. The results show that the slope of $f_s$ over $f_s$ can increase rapidly when $Q_e$ decreases. This implies that with a given frequency variation span, the available modulation range can be narrower under a light-load condition. In the shown example with $Q_e$ of 2.0, $f_s$ can vary from 80 to 250 kHz, and the largest $f_s$ results in 80° for mode change boundary angle $\theta_b$ as shown by $\theta_l$ corresponding to a switching frequency of 250 kHz. However, as can be seen, if the switching frequency is 150 kHz, in this case the mode change boundary angle $\theta_b$ can be selected as 70°. In any case, this highlights one example of how the hybrid modulation controller 103 can select mode change boundary angle $\theta_b$ based on switching frequency and various real-time circuit parameters detected for the hybrid modulation converter 100. These circuit parameters can include output current and output voltage among others. The potential drawbacks of VFM in light-load modulating capability can be overcome using SPDM, as illustrated in FIG. 4. The hybrid modulation controller 103 can combine these or any selected set of modulation methods, and can maximize efficiency and the general benefits of each of the modulation methods as described herein.

FIG. 4 shows an equivalent circuit model 403 and a graph 406 of waveforms for an example SPDM region of the hybrid modulation controlled DC-to-AC converter 100. The equivalent circuit model 403 includes an equivalent input voltage $V_{ie}$, an inductance $L_r$ in series with a capacitance $C_r$, and an equivalent output voltage $V_{oe}$.

Example steady-state waveforms of SPDM can be shown in the graph 406. Unlike regular PDM where $f_s$ is close to $f_r$, for efficiency optimization, the $f_s$ in SPDM can correspond to the highest $f_s$ in VFM, which can be far beyond $f_r$. In order to suppress output voltage ripple, the SRC can enter blank time after two pulses, and therefore the circuit operation can be divided into five intervals.

Interval 1 [$t_{s0}$-$t_{s1}$]: The DC-DC stage can awake from blank time at $t_{s0}$. $Q_1$ and $Q_4$ turn on with ZCS so regrettably energy loss from device parasitic capacitance is induced. Both the resonant inductor current $I_{Lr}$ and resonant capacitor voltage $V_{Cr}$ increase, which indicates the expand of resonant tank energy.

Interval 2 [$t_{s1}$-$t_{s2}$]: $Q_1$ and $Q_4$ can turn off at $t_{s1}$ and then the turn-off current discharges the parasitic output capacitance of $Q_2$ and $Q_3$. $Q_2$ and $Q_3$ can obtain ZVS turn-on after their drain-source voltages are completely reduced to zero. In the entire interval, $I_{Lr}$ keeps decreasing but $V_{Cr}$ is still charging up.

Interval 3 [$t_{s2}$-$t_{s3}$]: In this interval, the resonant inductor can accumulate energy and the current can flow in reverse direction. The increasing rate of current can be sharper than interval 1 as a result of the resonant capacitor energy. However, interval 3 can be shorter than interval 1 since $Q_2$ and $Q_3$ can already be turned on in interval 2.

Interval 4 [$t_{s3}$-$t_{s4}$]: All switches can be turned off and current can flow through the body diode of $Q_1$ and $Q_4$. The resonant tank returns energy in this interval.

Interval 5 [$t_{s4}$-$t_{s5}$]: Interval 5 can correspond to the blank time. All switches can remain off and no more actions are taken in the SRC.

In summary, $Q_2$ and $Q_3$ obtain ZVS turn-on while $Q_1$ and $Q_4$ obtain ZCS turn-on. Hard turn-off can appear at all switches, but its impact can be limited by modern semiconductor devices. Furthermore, both turn-on and turn-off losses can be weighted by pulse density $\rho_p$, so overall switching loss in the SPDM region is reduced.

From the perspective of loss analysis and output modulation, it is necessary to find out the relationship between $\rho_p$ and output voltage, which can be accomplished via time-domain analysis. The equivalent circuit model 403 can provide the output as a constant dc source throughout state 1 to state 4. In this example, the devices can be considered to be ideal switches with $L_m$ as infinite. $C_r$ can be considered fully depleted in state 5 to simplify the analysis, while the assumption will be weaker if $f_s$ is too close to $f_r$. The state equations in each interval can be derived in equations (9)-(11) with parameters summarized in Table II.

$$i_{Lr}(t) = \frac{K_i r}{Z_r}\sin(\omega_r(t-t_i)-\beta) \quad (9)$$

$$v_{C_r}(t) = K_v r\cos(\omega_r(t-t_i)-\beta)+O \quad (10)$$

$$\omega_r = \frac{1}{\sqrt{L_r C_r}}, Z_r = \sqrt{\frac{L_r}{C_r}} \quad (11)$$

TABLE II

Parameters for SPDM State Equations

| Interval | 1 | 2 | 3 | 4 |
|---|---|---|---|---|
| $(V_{ie}, V_{oe})$ | $(V_{in}, nV_o)$ | $(-V_{in}, nV_o)$ | $(-V_{in}, -nV_o)$ | $(V_{in}, -nV_o)$ |
| $t_i$ | $t_{s0}$ | $t_{s1}$ | $t_{s2}$ | $t_{s3}$ |
| r | $V_{in} - nV_o$ | $\sqrt{(V_{in}+nV_o+v_{Cr}(t_i))^2 + (i_{Lr}(t_i)Z_r)^2}$ | $V_{in} - nV_o + v_{Cr}(t_i)$ | $\sqrt{(V_{in}+nV_o-v_{Cr}(t_i))^2 + (i_{Lr}(t_i)Z_r)^2}$ |
| O | $V_{in} - nV_o$ | $-V_{in} - nV_o$ | $-V_{in} + nV_o$ | $V_{in} + nV_o$ |
| β | 0 | $\tan^{-1}\left(\frac{i_{Lr}(t_i)Z_r}{V_{in}+nV_o+v_{Cr}(t_i)}\right)$ | 0 | $\tan^{-1}\left(\frac{-i_{Lr}(t_i)Z_r}{V_{in}+nV_o+v_{Cr}(t_i)}\right)$ |
| $(\kappa_i, \kappa_v)$ | (1, -1) | (-1, 1) | (-1, 1) | (1, -1) |

The duration of each interval (i.e., $T_1$ to $T_4$) can be found in equation (12), where $\beta_x$ is the initial angle β for interval x. Since some of the parameters rely on initial conditions of an individual interval, state equations can be solved in the sequence of events. Based on equation (9), the total charge $Q_{tot}$ sent to the load can be calculated by equation (13), where $r_x$ is the state trajectory radius r for interval x. Finally, the average output current within [ts0, ts5] is entirely produced by $Q_{tot}$, so $\rho_p$ can be derived in equation (14). The value of $\rho_p$ can be unity whenever the inverter operates with VFM, so it falls earlier under light-load condition to make up for the vacancy left by VFM.

$$T_1 = \frac{1}{2f_s}, T_2 = \frac{\beta_2}{\omega_r}, T_3 = \frac{1}{2f_s} - \frac{\beta_2}{\omega_r}, T_4 = \frac{\beta_4}{\omega_r} \quad (12)$$

$$Q_{tot} = \sum_{k=1}^{4} Q_k = n\sum_{k=1}^{4}\left(\int_{t_{s(k-1)}}^{t_{sk}} |i_{Lr}(t)|dt\right) = nC_r[r_1(1-\cos(\omega_r T_1)) + \quad (13)$$
$$r_2(1-\cos(\beta_2)) + r_3(1-\cos(\omega_r T_3)) + r_4(1-\cos(\beta_4))]$$

$$\rho_p = \frac{\langle V_o \rangle_{[t_{s0}, t_{s5}]}}{Q_{tot} f_s R_o} \quad (14)$$

The state equations can provide modulation gain formula and also quantify circuit operation, which can be useful in describing the difference between SPDM and PDM. Under PDM ($f_s = f_r$), state 1 and state 3 each can take half of an active cycle, while state 2 and state 4 can be substantially omitted. Following equation (10), the resonant capacitor voltage can become ($2V_{in} - 2nV_o$) at the end of interval 1 and —($4V_{in} - 4nV_o$) at the end of interval 3.

The later one can reach 1.6 kV when the input is 400 V. Such high resonant voltage and corresponding high resonant current can create large component stresses and seriously harm inverter efficiency under PDM. The situation could be even worse if PDM had more than two consecutive pulses. In that case, the peak of resonant capacitor voltage can reach ($6V_{in} - 6nV_o$), ($8V_{in} - 8nV_o$) and can increase as an arithmetical ascending sequence until output voltage is heavily distorted. The phenomenon of ascending can be analogous to the start-up issue in a DC-DC LLC resonant converter, which can tend to energize the resonant tank rapidly during start-up and cause ringing. Therefore, the proposed SPDM can be a PDM control method that utilizes a two-pulse pattern to restrict every "energizing" process and stop before resonant voltage and current grow excessive. With this two-pulse pattern, SPDM can outperform PDM because it can shorten the energizing process and alleviate component stresses.

Figure 5:
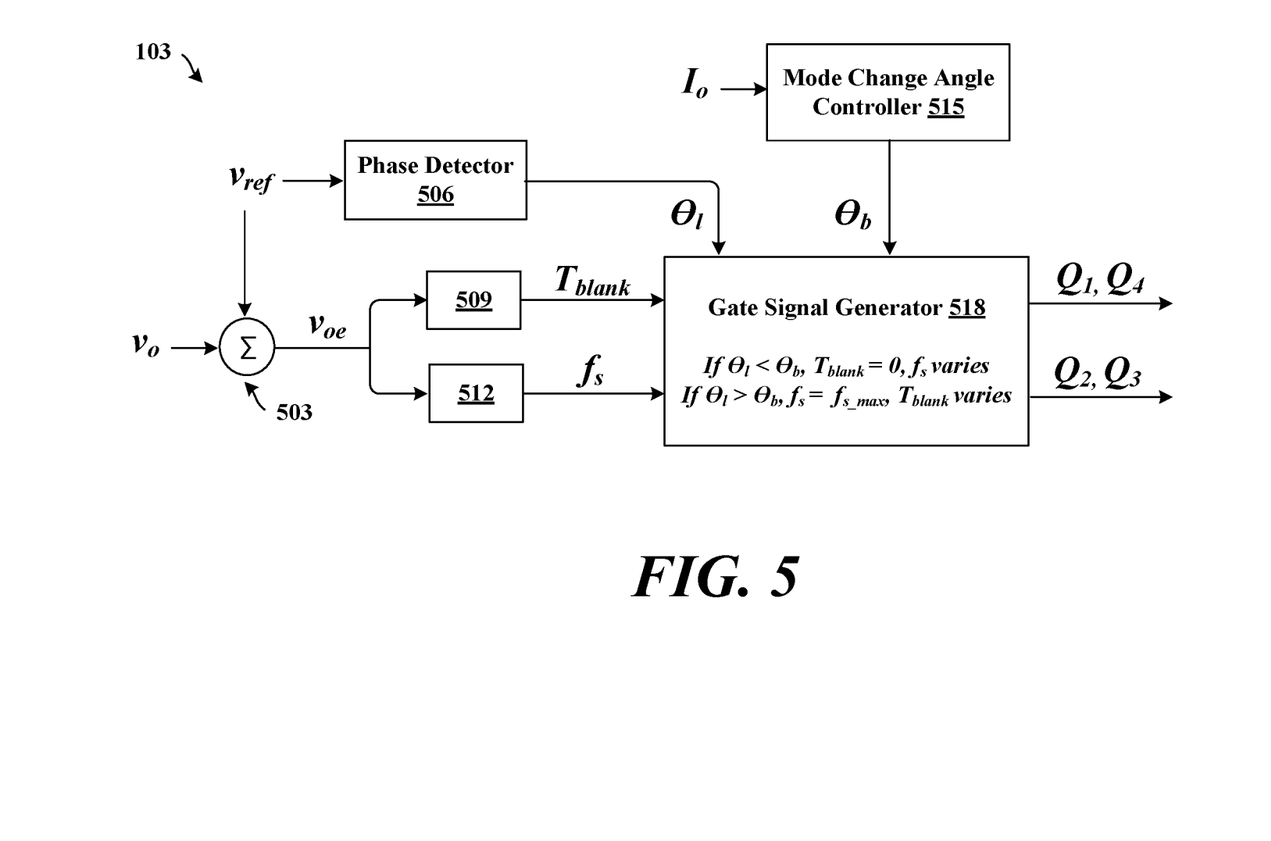
FIG. 5 illustrates a hybrid modulation controller of the hybrid modulation controlled DC-to-AC converter of FIG. 1, according to embodiments of the present disclosure.

FIG. 5 illustrates a hybrid modulation controller 103 of the hybrid modulation converter 100. The hybrid modulation controller 103 can include a difference circuit or comparator 503, a phase detector 506, SPDM compensator 509, VFM compensator 512, mode change angle controller 515, and gate signal generator 518, among other components. While the compensators can correspond to SPDM and VFM in this example, if another set of modulation techniques are used then the compensators can correspond to that set of modulation techniques.

The hybrid modulation controller 103 can depend on the particular application. This example shows a control block diagram when SRC-PDI is used as a standalone inverter. Output voltage $v_o$ can be the object of control so voltage sensing devices and the comparator 503 can be tracking the $v_o$ against the reference $V_{ref}$, which can be internally generated by the hybrid modulation controller 103 or a separate component. To switch between VFM and SPDM, SRC-PDI can decide the mode change angle $\theta_b$ based on load conditions and other real-time parameters and as discussed above. Given a maximum switching frequency $f_{s\_max}$ and other circuit parameters, $\theta_b$ can be calculated with the aid of equation (6) or by a lookup table. Maximum switching frequency $f_{s\_max}$ quality factor, and other circuit parameters can be input into the equation (6) or can be used as keys to identify an appropriate value of $\theta_b$ based on load conditions that can affect real-time circuit and output parameters.

The gate signal generator 518 or another component of the hybrid modulation controller 103 can compare $\theta_b$ with instant $\theta_i$ decide whether to utilize the SPDM compensator 509 or the VFM compensator 512. In this example, if $\Theta_i < \Theta_b$, then $T_{blank} = 0$, and $f_s$ varies. However, if $\Theta_i > \Theta_b$, then $f_s = f_{s\_max}$, and $T_{blank}$ varies. The gate signal generator 518 can then generate control signals $Q_1$, $Q_2$, $Q_3$, and $Q_4$. In some cases, control signals for $Q_1$ and $Q_4$ can be the same or equivalent to each other. Control signals for $Q_2$ and $Q_3$ can also be the same or equivalent to each other.

In other applications like an example with a grid-tied inverter, the object of control might become output current and $\Theta_l$ can be provided by a phase-locked loop. If input bus needs to be regulated, it can also be involved in one or more of the compensator components. However, the gate signals can be generated once $f_s$, $T_{blank}$, $\theta_l$ and $\theta_b$ are known. As a result, these parameters can be the basis of many different examples of hybrid modulation control types featuring any set of two modulation techniques used for various implementations.

The $f_s$ at $\theta_l$ of 0° can be the minimum switching frequency $f_{s\_min}$ and can be chosen as $f_r$ to utilize the SRC optimal point. Therefore $f_{s\_max}$, the f at $\theta_b$, can determine the range of switching frequency variation. There can be upper limits for $f_{s\_max}$ due to permeability roll-off, controller speed and other factors. In addition, the ZVS feature in VFM region can be lost if $f_{s\_max}$ is overextended. The turn-off current at $\theta_b$ can be calculated in equation (15), where $V_{om}$ is the peak output voltage. The resonant voltage ripple $\Delta V_{Cr\_b}$ can be estimated by equation (16). Given deadtime $t_d$ and time-related equivalent output capacitance $C_{oss\_tr}$ of each primary-side device, such turn-off current can comply with equation (17) to achieve ZVS.

$$i_{off\_b} = \frac{V_{in} - nV_{om}\cos\theta_b + \Delta V_{Cr\_b}}{Z_r}\sin\left(\frac{\omega_r}{2f_s}\right) - \frac{nV_{om}\cos\theta_b}{4f_{s\_max}L_m} \quad (15)$$

$$\Delta V_{Cr\_b} = \frac{V_{om}^2\cos^2\theta_b}{4V_{in}C_rR_of_{s\_max}} \quad (16)$$

$$i_{off}t_d \geq 2C_{oss\_tr}V_{in} \quad (17)$$

The lower bound of $f_{s\_max}$ can be an indicator of design rather than a hardware limit or warning line. One way to set the lower bound is by analyzing the resonant current peak in SPDM region. According to the state equations, the first resonant current peak (at $t_{s1}$ in graph 406 of FIG. 4) is calculated according to equation (18) and maximized around the zero-crossing-point in a certain line cycle. Equation (18) shows that a lower ratio of $f_s/f_r$ can lead to a higher peak.

The lower bound can be decided by the following two steps: (a) Assign a limit $i_{lim\_SPDM}$ to the resonant current peak (e.g., 70% of nominal output current), (b) Estimate the lower bound off $f_{s\_max}$ using equation (19).

$$i_{Lr}(t_{s1}) = \frac{V_{in} - nV_o}{Z_r}\sin\left(\frac{\omega_r}{2f_s}\right) \quad (18)$$

$$\frac{f_{s\_max}}{f_r} \geq \frac{\pi}{\sin^{-1}\left(\frac{i_{lim\_SPDM}Z_r}{V_{in}}\right)} \quad (19)$$

After both upper and lower bounds of $f_{s\_max}$ are determined, the actual $f_{s\_max}$ can be selected for optimal efficiency based on loss analysis equations later shown in table III. In general, a higher $f_{s\_max}$ can restrain the span of SPDM region, where the turn-on loss exists.

TABLE III

FORMULAS FOR LOSS ANALYSIS

| Loss type | Formula |
|---|---|
| $P_{cond}$ | $2I_{Lr\_rms}^2 R_{ds(on)}$ |
| $P_{dt}$ | $\int_0^{\theta_b} 8i_{off}(\theta_l)v_{sd}t_df_s(\theta_l)\frac{d\theta_l}{\pi} +$ $\int_{\theta_b}^{\frac{\pi}{2}} 4[i_{Lr}(t_{s1}, \theta_l)t_d + i_{Lr}(t_{s3}, \theta_l)T_4]v_{sd}f_{s\_max}\rho_p(\theta_l)\frac{d\theta_l}{\pi}$ |
| $P_{on}$ | $\int_{\theta_b}^{\frac{\pi}{2}} 4E_{oss}(V_{in})f_{s\_max}\rho_p(\theta_l)\frac{d\theta_l}{\pi}$ |
| $P_{off}$ | $\int_0^{\theta_b} 8E_{off}(i_{off}(\theta_l))f_s(\theta_l)\frac{d\theta_l}{\pi} +$ $\int_{\theta_b}^{\frac{\pi}{2}} 4[E_{off}(i_{Lr}(t_{s1}, \theta_l)) + E_{off}(i_{Lr}(t_{s3}, \theta_l))]f_{s\_max}\rho_p(\theta_l)\frac{d\theta_l}{\pi}$ |
| $P_{diode}$ | $2\langle|I_o|\rangle\langle V_f\rangle$ |
| $P_{uf}$ | $\frac{\pi^2\langle|I_0|\rangle^2}{4}R_{ds(on)\_uf}$ |
| $P_{Cr}$ | $I_{Lr\_rms}^2 R_{Cr}$ |
| $P_{Cu}$ | $I_{Lr\_rms}^2(R_{Lr} + R_{pri} + n^2 R_{sec})$ |
| $P_{Fe}$ | (22) for transformer core loss and replace $B_m$ with (26) for resonant inductor core loss |

$R_{ds(on)}$, $v_{sd}$, $E_{oss}$, $E_{off}$, $R_{ds(on)\_uf}$, $R_{Cr}$, $R_{Lr}$, $R_{pri}$, $R_{sec}$, $N_{Lr}$, $A_{e2}$ can be primary-side device on-resistance, body-diode forward voltage, output capacitance stored energy, turn-off energy, unfolder on-resistance, equivalent series resistance of resonant capacitor, resonant inductor winding resistance, transformer primary-side resistance, secondary-side resistance, resonant inductor number of turns, and core area, respectively.

Regarding transformer design, maximum magnetic flux density $B_m$ of the transformer can be expressed as equation (20), where $A_e$ and $N_p$ are core cross-sectional area and primary-side number of turns. Based on equation (20), B peaks with output voltage at $f_{s\_min}$. Therefore, the selection of core material starts with the ones suitable for $f_{s\_min}$. This can be selected based on data indicating a manufacturer's instruction. The risk of transformer saturation can be also limited by checking at $f_{s\_min}$. The permeability roll-off can occur after $f_{s\_max}$.

$$B_m = \frac{n|V_o|}{4f_sA_eN_p} \quad (20)$$

Since the SRC can have a normalized voltage gain of one at output peak/valley, the transformer turns ratio n should satisfy equation (21). After n is chosen and $L_m$ is determined by equation (4), the design of core size (i.e., $A_e$) and actual numbers of turns can be initiated. The estimation formulas of core loss and copper loss can be shown in equations (22) and (23).

$V_e$, $A_{wp}$, $A_{ws}$, $\sigma$ and MLT are core volume, primary-side wire area, secondary-side wire area, copper conductivity and mean length per turn, respectively. $K_f$, $k_f$ and $k_b$ are the coefficients of Steinmetz's equation. $I_{Lr\_rms}$ can be the RMS value of the resonant current, and can be calculated by equation (24). This value can also be identified based on software simulation. Some examples can obtain least total loss without violating core window area restriction of equation (25), where $W_A$ and $K_N$, are window area and filling factor. Equations (22) to (25) include three major variables ($A_e$, $W_A$, $N_p$), so an iterative process can be used in order to find the optimal solution.

$$n \leq \frac{V_{in}}{V_{om}} \quad (21)$$

$$P_{XR\_Fe} = \quad (22)$$

$$\int_0^{\theta_b} 2V_e k_1 f_s^{k_f}(\theta_l) B_m^{k_b}(\theta_l) \frac{d\theta_l}{\pi} + \int_{\theta_b}^{\frac{\pi}{2}} 2V_e k_1 f_{s\_max}^{k_f}(\theta_l) B_m^{k_b}(\theta_l) \rho_p(\theta_l) \frac{d\theta_l}{\pi}$$

$$P_{XR\_Cu} = I_{Lr\_rms}^2 \frac{N_p(MLT)}{\sigma} \left( \frac{1}{A_{wp}} + \frac{n}{A_{ws}} \right) \quad (23)$$

$$I_{Lr\_rms} = \sqrt{\frac{2}{\pi} \int_0^{\frac{\pi}{2}} i_{Lr}^2(\theta_l) d\theta_l} \quad (24)$$

$$N_p A_{wp} + \frac{N_p}{n} A_{ws} \leq K_u W_A \quad (25)$$

Regarding device and component selection, the design of the unfolding component 115 can be selected for low on-resistance and low cost semiconductor switches like super-junction (SJ) MOSFETs, despite high parasitic capacitance. This is because $Q_5$-$Q_8$ can be substantially free from switching losses. However, $Q_1$-$Q_4$ can demand more careful design since their $C_{oss\_tr}$ dominates the ZVS condition as shown in equation (17). A tradeoff between device on-resistance and parasitic capacitance can be made.

The design of the switches for a switched rectifier component 112 can be similar to $Q_1$-$Q_4$ and can include a tradeoff between diode forward voltage drop and parasitic junction capacitance. The junction capacitance and diode reverse recovery characteristic can hinder the ZVS condition in a subtle way. The impact can be minimized if the junction capacitance reflected to the primary side is much smaller than $C_{oss\_tr}$.

In various embodiments, the controllers described herein can be embodied as a collection of discrete, integrated, or a mixture of discrete and integrated analog, digital, or mixed analog and digital hardware circuit components. For example, the hybrid modulation controller 103 can be embodied as a collection of discrete analog, digital, or mixed analog and digital hardware circuit components. The hardware can include one or more discrete logic circuits, microprocessors, microcontrollers, or DSPs, application specific integrated circuits (ASICs), programmable logic devices (e.g., field-programmable gate array (FPGAs), or complex programmable logic devices (CPLDs)), among other types of processing circuitry.

In some cases, the microprocessors, microcontrollers, or DSPs can execute software to perform the control aspects of the embodiments described herein. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

Figure 6:
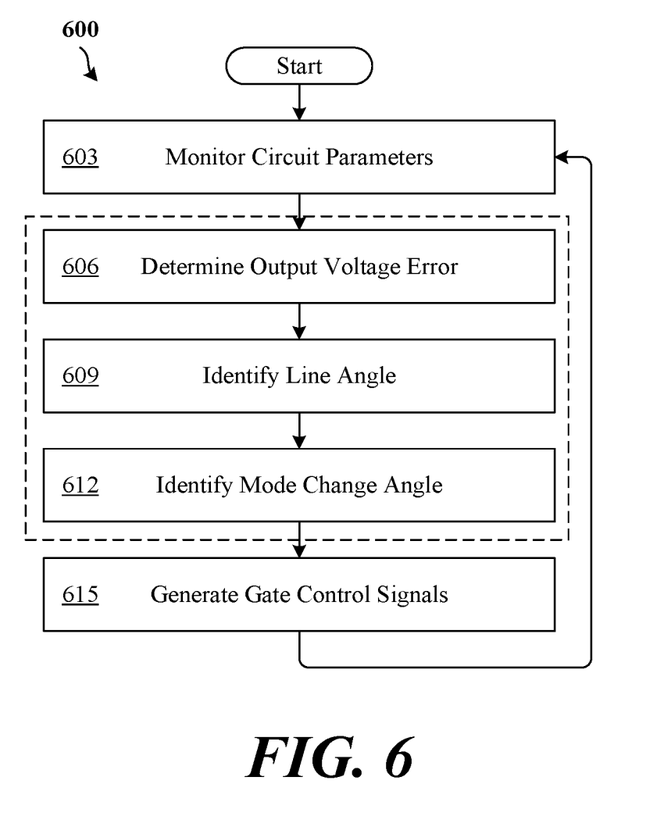
FIG. 6 illustrates a flowchart of functionalities performed by the hybrid modulation controlled DC-to-AC converter of FIG. 1, according to embodiments of the present disclosure.

FIG. 6 includes a flowchart 600 that describes functionalities performed by components of the hybrid modulation converter 100. While the flowchart 600 is discussed as being performed by the hybrid modulation controller 103, aspects of the flowchart 600 can be performed by other components of the hybrid modulation converter 100. Segmentation and arrangement of the order of the steps are by way of example. The steps can be performed in another order, scrambled relative to one another in any sequence and/or concurrently with any level of timing overlap as can be understood.

In step 603, the hybrid modulation controller 103 can monitor real-time circuit parameters of the hybrid modulation converter 100. Output voltage, output current, maximum switching frequency, quality factor, and other circuit parameters can be detected using appropriate sensor or detector circuits.

In step 606, the hybrid modulation controller 103 can determine an output voltage error. This can enable the hybrid modulation controller 103 to generate control circuit updates or modifications to initial or base gate control signals for the modulation component 106. Since the hybrid modulation controller 103 combines two different modulation techniques, it can include two different compensator components 509 and 512, corresponding to these modulation techniques. For example, an SPDM compensator 509 can provide an updated $T_{blank}$ to utilize for gate signal generation. The updated $T_{blank}$ can decrease or correct the output voltage error $v_{oe}$ or difference between actual output voltage $v_o$ and a reference voltage $v_{ref}$. A VFM compensator 512 can provide an updated $f_s$ to utilize for gate signal generation. The updated $f_s$ can decrease or correct the output voltage error $v_{oe}$ or difference between actual output voltage $v_o$ and a reference voltage $v_{ref}$. These modulation parameters, which can include parameters corresponding to each of the modulation types, can be provided to a gate control signal generator 518 or another component of the hybrid modulation controller 103.

In step 609, the hybrid modulation controller 103 can identify line angle $\theta_l$. For example, a phase detector circuit 506 or another device can be utilized to identify the line angle $\theta_l$. The phase detector circuit can take an input of the real-time circuit parameters such as output voltage, output current, and the reference voltage. The line angle $\theta_l$ can be provided to a gate control signal generator 518 or another component of the hybrid modulation controller 103.

In step 612, the hybrid modulation controller 103 can identify the mode change angle $\theta_b$. For example, a mode change angle controller 515 can take an input of the real-time circuit parameters including the output current, output voltage, and other parameters. The mode change angle controller 515 can identify the mode change angle $\theta_b$ in view of these real-time circuit parameters.

For example, the mode change angle controller 515 can calculate the mode change angle $\theta_b$ by using equation (6), or by a lookup table. Maximum switching frequency $f_{s\_max}$, quality factor, and other circuit parameters can be input into the equation (6) in view of the other equations herein, in order to identify an appropriate value of $\theta_b$ based on load conditions that can affect real-time circuit and output parameters. The mode change angle $\theta_b$ can be provided to a gate control signal generator 518 or another component of the hybrid modulation controller 103.

In step 615, the hybrid modulation controller 103 can generate gate control signals according to a hybrid modulation technique that combines multiple modulation techniques. The gate control signal generator 518 or another component of the hybrid modulation controller 103 can generate gate control signals based on the mode change angle $\theta_b$, line angle $\theta_l$, and the modulation parameters.

Aspect 1 describes a computer-implemented method for generating a waveform, comprising: determining a hybrid modulation pattern that separates switch gating control into a plurality of control regions for a half cycle of the waveform, wherein a first control region controls the plurality of switches according to a first modulation technique and a second control region controls the plurality of switches according to a second modulation technique; and controlling a plurality of switches of a resonant converter according to the hybrid modulation pattern to generate the waveform. Aspect 2 describes the computer-implemented method of aspect 1, wherein the hybrid modulation pattern utilizes a short pulse density modulation (SPDM) technique for the first control region, and the hybrid modulation pattern utilizes a variable frequency modulation (VFM) technique for the second control region. Aspect 3 describes the computer-implemented method of any one of aspect 1 or 2, wherein the first control region comprises a low-output region relative to a threshold voltage and the second control region comprises a high-output region relative to the threshold voltage. Aspect 4 describes the computer-implemented method of any one of aspects 1-3, wherein the plurality of switches are primary-side switches of the resonant converter. Aspect 5 describes the computer-implemented method of any one of aspects 1-4, wherein the resonant converter is a series resonant converter. Aspect 6 describes the computer-implemented method of any one of aspects 1-5, wherein the resonant converter is coupled to an unfolding circuit, and the waveform comprises an alternating current (AC) waveform. Aspect 7 describes the computer-implemented method of any one of aspects 1-6, wherein the waveform comprises a sinusoidal wave. Aspect 8 describes the computer-implemented method of any one of aspects 1-7, wherein a primary side of the resonant converter is soft-switched.

Aspect 9 describes a system for waveform generation, the system comprising: a modulating circuit comprising a plurality of switches controlled according to a hybrid modulation pattern that separates switch gating control into a plurality of control regions for a half cycle of a waveform, wherein a first control region controls the plurality of switches according to a first modulation technique and a second control region controls the plurality of switches according to a second modulation technique; and a rectifying circuit communicatively coupled to the modulating circuit, wherein the system generates the waveform based at least in part on the hybrid modulation pattern. Aspect 10 describes the system of aspect 9, further comprising: an unfolding circuit coupled to the rectifying circuit, wherein the unfolding circuit outputs the waveform. Aspect 11 describes the system of aspect 9 or 10, wherein the unfolding circuit comprises a plurality of switches that are switched to generate a positive half-cycle and a negative half-cycle of the waveform. Aspect 12 describes the system of any one of aspects 9-11, wherein the modulating circuit is soft-switched. Aspect 13 describes the system of any one of aspects 9-12, wherein the hybrid modulation pattern utilizes a short pulse density modulation (SPDM) technique for the first control region, and the hybrid modulation pattern utilizes a variable frequency modulation (VFM) technique for the second control region. Aspect 14 describes the system of any one of aspects 9-13, wherein the first control region comprises a low-output region relative to a threshold voltage and the second control region comprises a high-output region relative to the threshold voltage. Aspect 15 describes the system of any one of aspects 9-14, wherein the modulating circuit and the rectifying circuit comprise a series resonant converter. Aspect 16 describes a non-transitory computer readable medium comprising executable instructions that cause at least one computing device to at least: determine a hybrid modulation pattern that separates switch gating control into a plurality of control regions for a half cycle of the waveform, wherein a first control region modulates according to a first modulation technique and a second control region modulates according to a second modulation technique; and control a plurality of switches of a resonant converter according to the hybrid modulation pattern to generate the waveform. Aspect 17 describes the non-transitory computer readable medium of aspect 16, wherein the hybrid modulation pattern utilizes a short pulse density modulation (SPDM) technique for the first control region, and the hybrid modulation pattern utilizes a variable frequency modulation (VFM) technique for the second control region. Aspect 18 describes the non-transitory computer readable medium of aspect 16 or 17, wherein the first control region comprises a low-output region relative to a threshold voltage and the second control region comprises a high-output region relative to the threshold voltage. Aspect 19 describes the non-transitory computer readable medium of any one of aspects 16-18, wherein the resonant converter is coupled to an unfolding circuit, and the waveform comprises a sinusoidal waveform. Aspect 20 describes the non-transitory computer readable medium of any one of aspects 16-19, wherein a primary side of the resonant converter is soft-switched.

Although the functionalities, services, programs, and computer instructions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Although flowcharts can show a specific order of execution, it is understood that the order of execution can differ from that which is depicted. For example, the order of execution of two or more blocks can be scrambled relative to the order shown. The flowcharts can be viewed as depicting an example of a method implemented by a computing device. The flowchart can also be viewed as depicting an example of instructions executed in a computing device. Also, two or more blocks shown in succession can be executed concurrently or with partial concurrence. Further, in some embodiments, one or more of the blocks shown can be skipped or omitted. In addition, any number of counters, state variables, semaphores, or warning messages might be added to the logical flow described herein, for purposes of enhanced utility, accounting, performance measurement, or providing troubleshooting aids, etc. It is understood that all such variations are within the scope of the present disclosure.

Also, the functionalities described herein that include software or code instructions can be embodied in any non-transitory computer-readable medium, which can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RANI) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or functionality described herein can be implemented and structured in a variety of ways. For example, one or more applications described can be implemented as modules or components of a single application or set of instructions. Further, one or more instructions described herein can be executed in shared or separate computing devices or a combination thereof.

The above-described examples of the present disclosure are merely possible examples of implementations set forth for a clear understanding of the principles of the disclosure. While aspects and figures are provided for clarity of discussion, it is understood that the concepts described with respect to a particular figure or context can be utilized and combined with the concepts described with respect to the other figures and contexts. These variations and modifications can be made without departing substantially from the principles of the disclosure. All such modifications and variations are intended to be included herein within the scope of this disclosure and protected by the following claims.

Therefore, the following is claimed:

1. A computer-implemented method for generating a waveform, the method comprising:
   determining, using a hybrid modulation controller device, a hybrid modulation pattern that separates switch gating control into a plurality of control regions for a half cycle of the waveform, wherein a first control region controls a plurality of switches according to a first modulation technique and a second control region controls the plurality of switches according to a second modulation technique;
   monitoring, using the hybrid modulation controller device, a line angle of the waveform to identify a match between the line angle and a predetermined mode change boundary angle that defines a boundary between the first control region and the second control region; and
   controlling, using the hybrid modulation controller device, a plurality of switches of the resonant converter according to the hybrid modulation pattern to generate the waveform, wherein the hybrid modulation controller device changes from the first control region to the second control region in an instance in which the line angle matches the predetermined mode change boundary angle.

2. The computer-implemented method of claim 1, wherein the hybrid modulation pattern utilizes a short pulse density modulation (SPDM) technique for the first control region, and the hybrid modulation pattern utilizes a variable frequency modulation (VFM) technique for the second control region.

3. The computer-implemented method of claim 1, wherein the first control region comprises a low-output region relative to a threshold voltage and the second control region comprises a high-output region relative to the threshold voltage.

4. The computer-implemented method of claim 1, wherein the plurality of switches are primary-side switches of the resonant converter.

5. The computer-implemented method of claim 1, wherein the resonant converter is a series resonant converter.

6. The computer-implemented method of claim 1, wherein the resonant converter is coupled to an unfolding circuit, and the waveform comprises an alternating current (AC) waveform.

7. The computer-implemented method of claim 1, wherein the waveform comprises a sinusoidal wave.

8. The computer-implemented method of claim 1, wherein a primary side of the resonant converter is soft-switched.

9. A system for waveform generation, the system comprising:
   a modulating circuit comprising a plurality of switches controlled according to a hybrid modulation pattern that separates switch gating control into a plurality of control regions for a half cycle of a waveform, wherein a first control region controls the plurality of switches according to a first modulation technique and a second control region controls the plurality of switches according to a second modulation technique;
   a hybrid modulation controller that controls the modulating circuit to change from the first control region to the second control region based at least in part on a line angle of the waveform and a predetermined mode change boundary angle that defines a boundary between the first control region and the second control region, wherein the hybrid modulation controller device monitors the line angle; and
   a rectifying circuit communicatively coupled to the modulating circuit, wherein the system generates the waveform based at least in part on the hybrid modulation pattern.

10. The system of claim 9, further comprising:
    an unfolding circuit coupled to the rectifying circuit, wherein the unfolding circuit outputs the waveform.

11. The system of claim 10, wherein the unfolding circuit comprises the plurality of switches that are switched to generate a positive half-cycle and a negative half-cycle of the waveform.

12. The system of claim 9, wherein the modulating circuit is soft-switched.

13. The system of claim 9, wherein the hybrid modulation pattern utilizes a short pulse density modulation (SPDM) technique for the first control region, and the hybrid modulation pattern utilizes a variable frequency modulation (VFM) technique for the second control region.

14. The system of claim 9, wherein the first control region comprises a low-output region relative to a threshold voltage and the second control region comprises a high-output region relative to the threshold voltage.

15. The system of claim 9, wherein the modulating circuit and the rectifying circuit comprise a series resonant converter.

16. A non-transitory computer readable medium comprising executable instructions that cause at least one computing device to at least:
- determine, using a hybrid modulation controller device, a hybrid modulation pattern that separates switch gating control into a plurality of control regions for a half cycle of a waveform, wherein a first control region modulates according to a first modulation technique and a second control region modulates according to a second modulation technique;
- monitor, using the hybrid modulation controller device, a line angle of the waveform to identify a match between the line angle and a predetermined mode change boundary angle that defines a boundary between the first control region and the second control region; and
- control, using the hybrid modulation controller device, a plurality of switches of a resonant converter according to the hybrid modulation pattern to generate the waveform, wherein the hybrid modulation controller device changes from the first control region to the second control region in an instance in which the line angle matches the predetermined mode change boundary angle.

17. The non-transitory computer readable medium of claim 16, wherein the hybrid modulation pattern utilizes a short pulse density modulation (SPDM) technique for the first control region, and the hybrid modulation pattern utilizes a variable frequency modulation (VFM) technique for the second control region.

18. The non-transitory computer readable medium of claim 16, wherein the first control region comprises a low-output region relative to a threshold voltage and the second control region comprises a high-output region relative to the threshold voltage.

19. The non-transitory computer readable medium of claim 16, wherein the resonant converter is coupled to an unfolding circuit, and the waveform comprises a sinusoidal waveform.

20. The non-transitory computer readable medium of claim 16, wherein the predetermined mode change boundary angle is identified based at least in part on at least one real-time load condition parameter of a circuit comprising the resonant converter and the hybrid modulation controller device.

* * * * *